US007711448B2

(12) United States Patent
Fujii et al.

(10) Patent No.: US 7,711,448 B2
(45) Date of Patent: May 4, 2010

(54) IMAGE FORMING SYSTEM AND INSERTER DEVICE

(75) Inventors: Shuhji Fujii, Kyoto (JP); Nobuyuki Ueda, Yamatokoriyama (JP); Kenji Takahashi, Yamatokoriyama (JP); Yuji Okamoto, Kyoto (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 1092 days.

(21) Appl. No.: 10/921,128

(22) Filed: Aug. 19, 2004

(65) Prior Publication Data

US 2005/0042007 A1 Feb. 24, 2005

(30) Foreign Application Priority Data

Aug. 21, 2003 (JP) ............................ 2003-208248

(51) Int. Cl.
*G06F 7/00* (2006.01)

(52) U.S. Cl. ..................... 700/213; 270/52.13; 271/296

(58) Field of Classification Search ................. 700/213, 700/221; 209/3.3; 270/52.13; 271/4.01, 271/296, 303

See application file for complete search history.

(56) References Cited

U.S. PATENT DOCUMENTS 4,602,776 A 7/1986 York et al.
5,390,910 A * 2/1995 Mandel et al. .............. 271/296
5,489,969 A * 2/1996 Soler et al. .................... 399/18
6,118,544 A * 9/2000 Rao .......................... 358/1.18
6,734,999 B1 * 5/2004 Nagatani .................... 358/498
7,113,846 B2 * 9/2006 Moriyama et al. .......... 700/223
7,318,584 B2 * 1/2008 Kato et al. ............... 270/58.11
2001/0021036 A1 * 9/2001 Nimura et al. ............. 358/1.12

FOREIGN PATENT DOCUMENTS

JP 62-191358 A 8/1987
JP 2003-21984 A 1/2003
JP 2003-307889 A 10/2003

* cited by examiner

*Primary Examiner*—Gene Crawford
*Assistant Examiner*—Ramya Prakasam
(74) *Attorney, Agent, or Firm*—Birch, Stewart, Kolasch & Birch, LLP

(57) ABSTRACT

A control command communicated between a print control section and a finisher control section are relayed by an inserter control section. The print control section and the finisher control section generate the control command without taking into account processing at an inserter, and the inserter control section judges the content of the control command upon receiving the control command sent from the print control section or the finisher control section, and converts the control command or adjusts output timing of the control command if the control command needs to take into account the processing at the inserter.

12 Claims, 10 Drawing Sheets

FIG. 3

TRANSPORT PLAN TABLE

| PAPER ID | IMAGE ID | IMAGE PROCESSING | POST-PROCESSING | EJECT DESTINATION | PAPER FEEDER |
|---|---|---|---|---|---|
| 1 | - | - | STAPLE S | PAPER EJECT TRAY 1 | INSERTER |
| 2 | ID1 | SINGLE-SIDED PRINTING | STAPLE | PAPER EJECT TRAY 1 | PAPER FEED TRAY 1 |
| 3 | ID2 | SINGLE-SIDED PRINTING | STAPLE E | PAPER EJECT TRAY 1 | PAPER FEED TRAY 1 |

INSERT MODE 1

INSERT MODE 3

IMAGE FORMING SYSTEM AND INSERTER DEVICE

This Nonprovisional application claims priority under 35 U.S.C. §119(a) on Patent Application No. 208248/2003 filed in Japan on Aug. 21, 2003, the entire contents of which are hereby incorporated by reference.

FIELD OF THE INVENTION

The present invention relates to an image forming system in which a copying machine is combined with an optional device such as an inserter device and a post-processing device; and an inserter device used in the image forming system.

BACKGROUND OF THE INVENTION

In an image forming system in which a printing apparatus main body is attached with optional devices such as a post-processing device, an inserter device, and a paper feeding device, timing such as timing of transporting sheets to the optional devices is managed and controlled by the printing apparatus main body.

An example of the image forming system in which the optional device is attached to the printing apparatus main body is an image forming system shown in Japanese Unexamined Patent Publication No. 2003-21984 (Tokukai 2003-21984, published on Jan. 24, 2003). In this image forming system, an optional device in which a post-processing device and an inserter device are integrated is attached to an image forming apparatus main body. Here, when interleaving sheet insertion and staple processing are performed in the system, the optional devices are controlled in a unified manner by the image forming apparatus.

However, the system employing the optional device in which the post-processing device and the inserter device are integrated, as disclosed in Tokukai 2003-21984, offers less flexibility to a user who requires a function provided by the post-processing device (sort function, staple processing function, for example) but does not require a function provided by the inserter device (interleaving sheet insertion function).

Further, there is also an image forming system that includes the post-processing device and the inserter device separately as different optional devices and can serve as either a system composed of the image forming apparatus and the post-processing device or a system composed of the image forming apparatus, the post-processing device, and the inserter device. When the image forming system as described above is established as the system to which both the post-processing device and the inserter device are attached, the inserter device is provided between the image forming apparatus main body and the post-processing device.

In the system employing the optional device in which the post-processing device and the inserter device are integrated as described in Tokukai 2003-21984 (see FIG. 10(*a*)), and in the system composed of the image forming apparatus and the post-processing device (see FIG. 10(*b*)), only one system of a control line is required to connect the image forming apparatus with the optional device.

On the other hand, in the image forming system that includes the post-processing device and the inserter device separately as different optional devices as described above, the image forming apparatus main body manages and controls both the post-processing device and the inserter device. Accordingly, the image forming apparatus is required to use control lines in two systems, as shown in FIG. 10(*c*). This complicates the arrangement of the control system.

Further, in the image forming system provided with the inserter device, a transport path from the main body to the post-processing device is longer by the length of the inserter device, compared with the image forming system that is not provided with the inserter device. Accordingly, the image forming apparatus main body is required to prepare two types of control programs respectively for (i) control (timing control, in particular) of the post-processing device in a case where the inserter device is not attached, and (ii) control of the post-processing device in a case where the inserter device is attached. This increases the workload of control processing on the image forming apparatus.

Further, if the specification of the inserter device changes, for example, it is necessary to modify the control program of the image forming apparatus main body accordingly.

SUMMARY OF THE INVENTION

In order to solve the foregoing problems, the present invention has an objective to provide an image forming system in which the control system is simplified and control processing in the image forming apparatus is reduced.

In order to achieve the foregoing objective, an image forming system of. the present invention in which an inserter device and a post-processing device are attached to an image forming apparatus is so arranged that a control command communicated between the image forming apparatus and the post-processing device is relayed by the inserter device.

With this arrangement, a control command communicated between the image forming apparatus and the post-processing device is sent via the inserter device. Therefore the image forming apparatus is not required to be provided with control systems respectively for the inserter device and the post-processing device. Accordingly, only one system of the control system is required, so that the arrangement of the control system is simplified.

For a fuller understanding of the nature and advantages of the invention, reference should be made to the ensuing detailed description taken in conjunction with the accompanying drawings.

BRIEF DESCRIPTION OF THE DRAWINGS

FIG. 3 is a diagram showing an example of a transport plan table created on the occasion when the image forming system performs a print job.

FIG. 10(*b*) is a block diagram showing a control system in an image forming system composed of an image forming apparatus and an optional device, in a case where only a post-processing device is attached as the optional device.

FIG. 10(*c*) is a block diagram showing a control system in an image forming system composed of an image forming apparatus and an optional device, in a case where an inserter device and a post-processing device are attached as the optional device in accordance with a conventional arrangement.

FIG. 10(*d*) is a block diagram showing a control system in an image forming system composed of an image forming apparatus and an optional device, in a case where an inserter device and a post-processing device are attached as the optional device in accordance with an arrangement of the present embodiment.

DESCRIPTION OF THE EMBODIMENTS

The following will explain an embodiment of the present invention with reference to the drawings.

Figure 2:
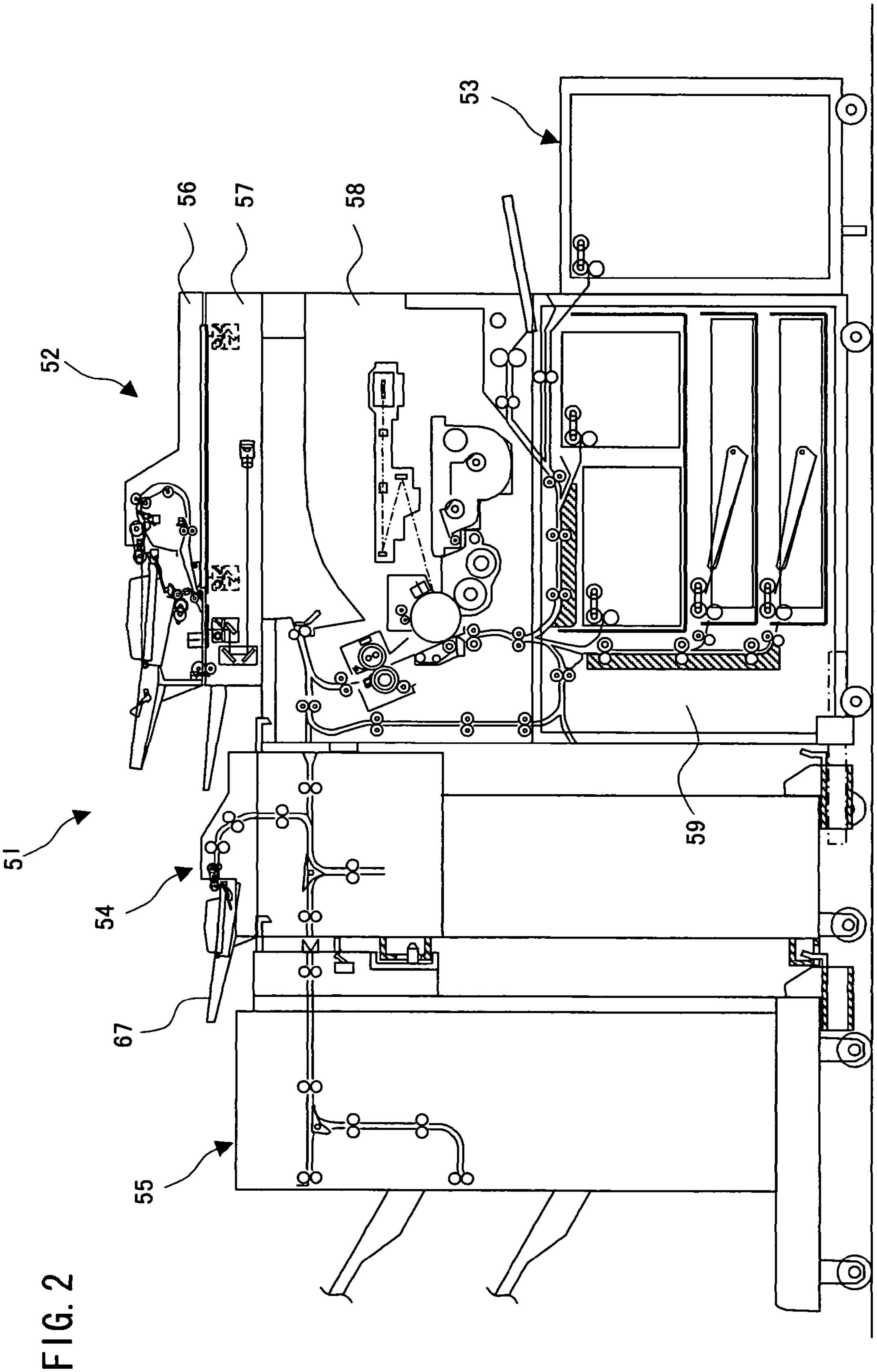
FIG. 2 is a cross-sectional view showing an arrangement of the image forming system.

As shown in FIG. 2, an image forming system 51 in accordance with the present invention includes a copying machine 52, a sheet supply device 53, an inserter 54, and a finisher 55.

The copying machine 52 prints image information on a sheet (print sheet, recording material). The copying machine 52 is schematically provided with an automatic document feeder 56, an image reading device 57, an image forming section 58, and a sheet feeding device 59.

The automatic document feeder 56 and the image reading device 57 are provided above the image forming section 58 so as to read a document to obtain image information of the document. Further, the sheet feeding device 59 is provided below the image forming section 58 so as to supply sheets to the image forming section 58.

On the other hand, the sheet supply device 53 is provided on a side of the copying machine 52 and attached to the copying machine 52. The sheet supply device 53 is a detachable device for supplying sheets to the image forming section 58 of the copying machine 52, and is provided separately from the image forming section 58 and copying machine 52.

The inserter 54 is used to insert a desired sheet (cover paper, divider paper, and the like) into a certain position of a group of sheets successively sent from the copying machine 52 or other device. Here, if insertion of the desired sheet as described above is allowed only in the copying machine 52, for example, a sheet that does not need to pass through the image forming section 58 of the copying machine 52 is also inserted via the image forming section 58. By using the inserter 54, it is possible to insert the desired sheet without causing the desired sheet to pass through the image forming section 58 of the copying machine 52.

The inserter 54 includes an interleaving sheet feed tray 67. On the interleaving sheet feed tray 67, sheets to be inserted, namely, sheets for cover paper, and sheets prepared by another image forming apparatus such as an ink-jet printer, are placed. In accordance with appropriate timing in preset order, the inserter 54 can insert the sheets placed on the interleaving sheet feed tray 67 into sheets sent from the copying machine 52. The inserter 54 then transports the resultant sheets to the finisher 55.

The finisher 55 performs post-processing with respect to the sheets transported from the inserter 54. The finisher 55 has the function to perform the post-processing such as punching holes into the sheets, stapling the sheets, and sorting the sheets, for example.

Figure 1:
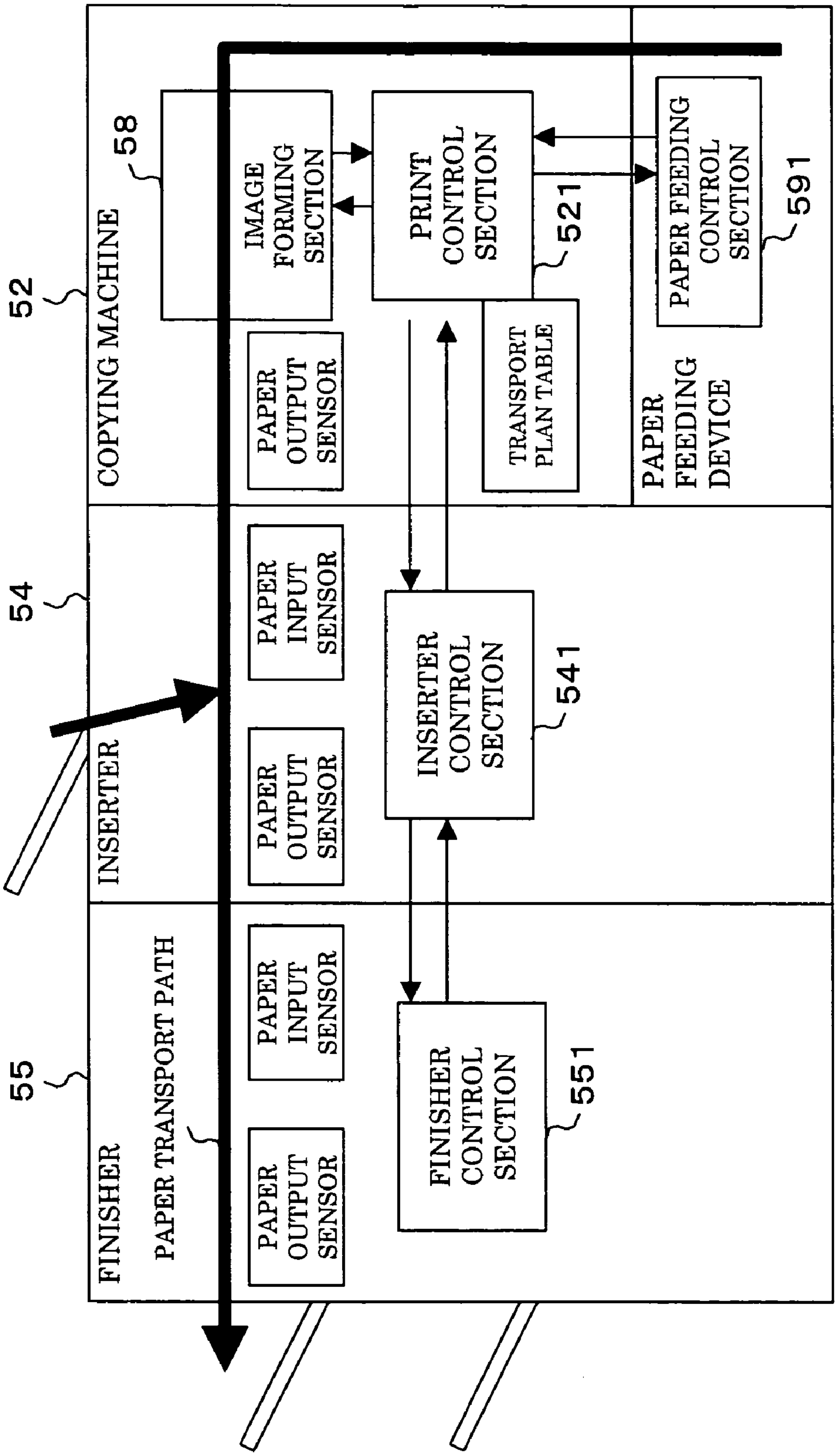
FIG. 1 shows an embodiment of the present invention, and is a block diagram schematically showing an arrangement of a control system in an image forming system composed of a copying machine, an inserter, and a finisher.

FIG. 1 schematically shows a control system in accordance with the image forming system 51.

The copying machine 52, the inserter 54, the finisher 55, and the paper feeding device (sheet feeding device 59 and large capacity sheet supply device 53) that compose the image forming system 51 are provided with a print control section 521, an inserter control section 541, a finisher control section 551, and a paper feed control section 591, respectively.

Further, the copying machine 52 is provided with a paper output sensor 522. The inserter 54 is provided with a paper input sensor 542 and a paper output sensor 543. The finisher 55 is provided with a paper input sensor 552 and a paper output sensor 553.

The print control section 521 controls the operation of each part of the copying machine 52 (printing operation at the image forming section 58, for example), and also functions as a main control section of the image forming system. The print control section 521 sends control commands to the control sections (inserter control section 541, finisher control section 551, and paper feed control section 591) of the optional devices (inserter 54, finisher 55, and paper feeding device) so as to allow the copying machine 2 and the optional devices to operate in an associated manner.

In the image forming system 51, the control system for transmitting the control commands from the print control section. 521 to the inserter control section 541 and the finisher control section 551 is only one system, as shown in FIG. 10(*d*). Namely, the control commands sent from the print control section 521 to the finisher control section 551 are sent via the inserter control section 541. Further, in a system configuration that does not adopt the inserter 54, the control commands are directly sent from the print control section 521 to the finisher control section 551.

In order to perform a print job in the image forming system as described above, the print control section 521 creates a transport plan table in accordance with input instructions for the job. FIG. 3 shows an example of the transport plan table.

The transport plan table shown in FIG. 3 is composed of paper ID, image ID, image processing information, post-processing information, eject destination information, and paper feeder information. The paper ID is an ID number assigned to each sheet to be ejected in the job. The image ID is an ID number of image data to be printed on each sheet. Two image IDs are given to a sheet to be subject to both-sided (double-sided) printing. The image processing information indicates whether the printing processing to be performed on each sheet is either single-sided printing or both-sided printing. The post-processing information indicates a type of the post-processing to be performed on each sheet. The eject destination information indicates a tray to which each sheet is to be ejected. The paper feeder information indicates a feeder from which each sheet is fed.

A job illustrated by the transport plan table shown in FIG. 3 involves three sheets, and the first sheet (whose paper ID is "1") is a sheet supplied from the inserter 54 (cover paper, for example). Therefore the first sheet is not subject to the printing processing by the copying machine 52. Accordingly, the image ID and the image processing information are not set with respect to the first sheet. Further, Staple S in the post-processing information of the first sheet indicates that the sheet is the first sheet of a group of sheets to be subject to staple processing. Likewise, Staple E in the post-processing information of the third sheet indicates that the sheet is the last sheet of the group of sheets to be subject to the staple processing.

Next, the operation of the image forming system as described above will be explained.

Figure 4:
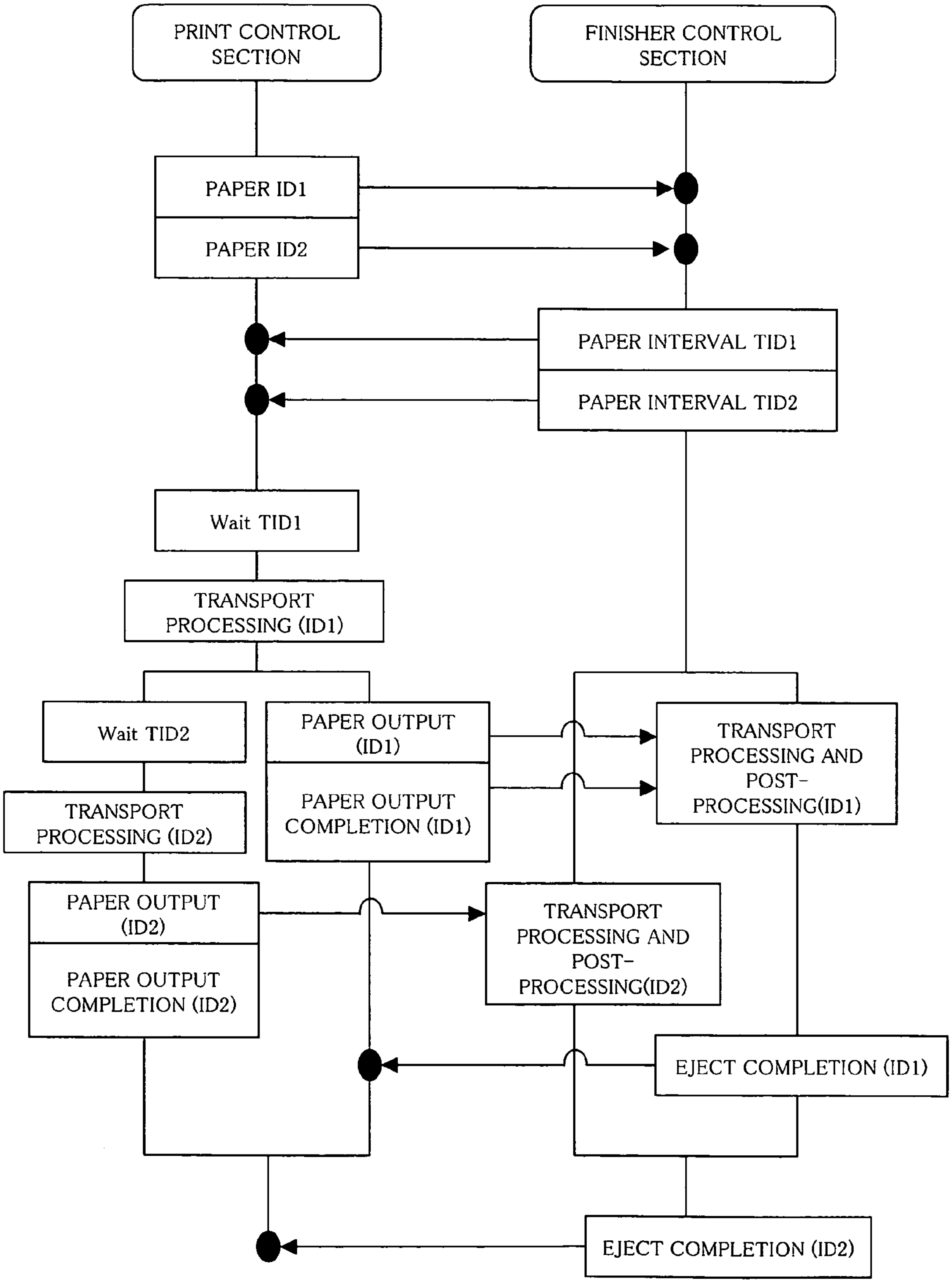
FIG. 4 is a flowchart showing an operation in which a sheet that has been subjected to printing processing at the copying machine is output to an eject tray of the finisher (through mode) in a system configuration to which the inserter is not attached.
Figure 5:
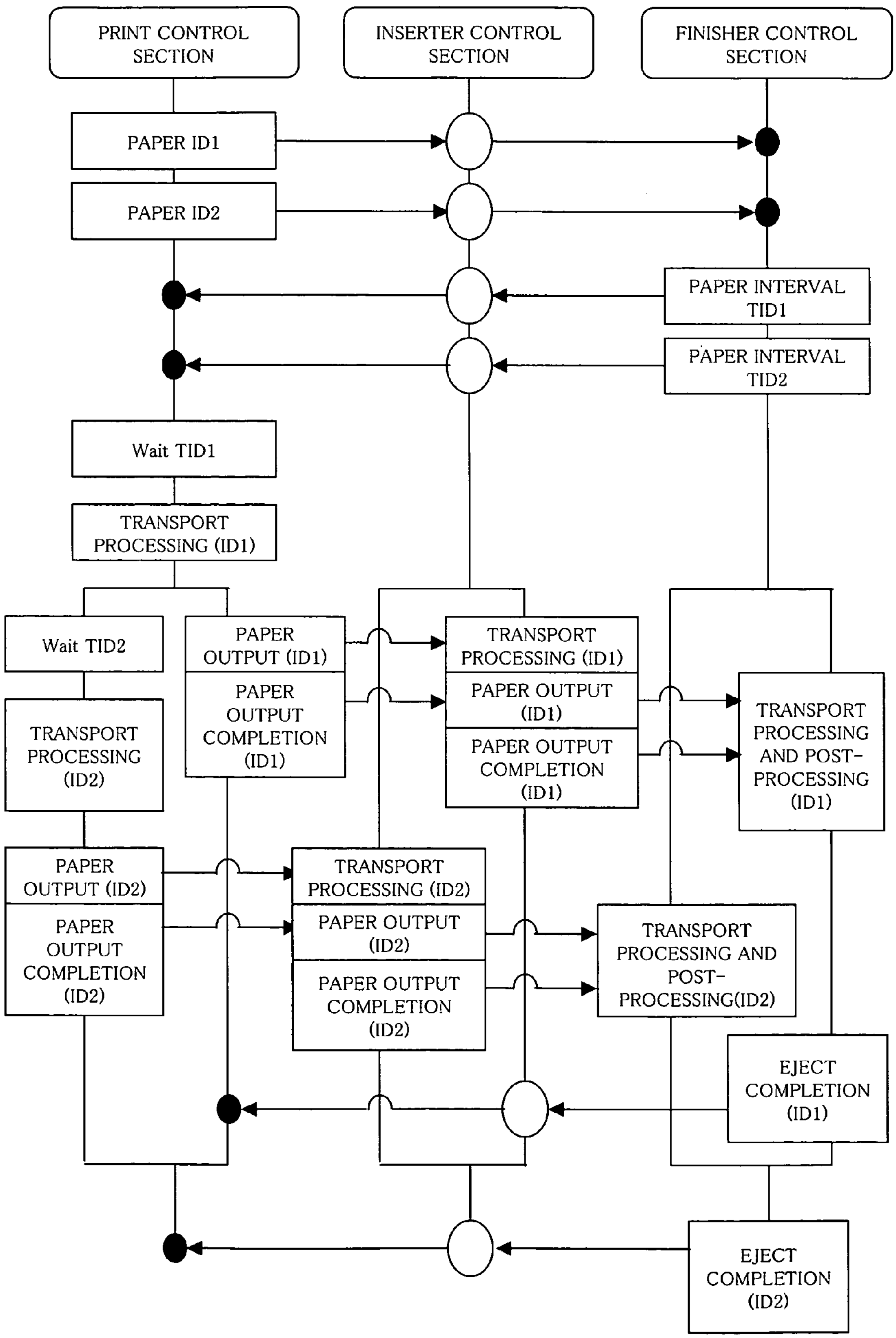
FIG. 5 is a flowchart showing an operation in which a sheet that has been subjected to printing processing at the copying machine is output to an eject tray of the finisher (through mode) in a system configuration to which the inserter is attached.

FIGS. 4 and 5 are flowcharts showing operation in which a sheet subjected to the printing processing at the copying machine 52 is output to a paper eject tray of the finisher 55 (through mode).

The processing shown in FIG. 4 is an example of the operation in a case where the inserter 54 is not attached between the copying machine 52 and the finisher 55. First, the print control section 521 in the copying machine 52 sends to the finisher control section 551, the paper ID of a sheet on which printing processing is to be performed. Note that, FIG. 4 shows the processing with respect to the first two sheets of a plurality of sheets successively processed. Thus, the print control section 521 sends to the finisher control section 551, the paper IDs (paper ID 1 and paper ID 2 in FIG. 4) of the two sheets first.

Upon receiving notification of the paper IDs, the finisher control section 551 sends paper intervals to the print control section 521. The paper interval indicates a period (interval) until a point when the transporting of a certain sheet is allowed after the previous sheet is transported during the operation for successively transporting sheets. The paper interval is calculated by the finisher control section 551 in accordance with the type(s) of the post-processing operation instructed in the finisher 55, etc.

Upon receiving notification of the paper intervals, the print control section 521 causes the copying machine 52 to start transport processing of the first sheet (paper ID 1) after waiting for a period of a notified paper interval TID1 from the time point when the print control section 521 receives notification of the paper interval TID1. Note that, as for the transporting of the first sheet, the actual paper interval TID1 is basically 0 so that the copying machine 52 can start the transport processing of the first sheet almost simultaneously with the receipt of notification of the paper interval. Note that, a position at which the transport processing starts is not limited, but is preferably a position before. reaching the image forming section 58 (position of a PS roller), for example.

Further, a paper interval TID2 for the second sheet (paper ID 2) is notified here at the same time, but the paper interval TID2 is temporarily retained at the print control section 521.

Further, when the transport processing of the sheet in the copying machine 52 starts and the sheet enters the paper output sensor at an exit of the copying machine, the print control section 521 sends a paper output command to the finisher control section 551. Then, when the sheet passes through the paper output sensor, the print control section 521 sends a paper output completion command to the finisher control section 551.

After receiving the paper output command or the paper output completion command, the finisher control section 551 controls the finisher 55 to perform transport processing and post-processing on the sheet sent from the copying machine 52 and to eject the sheet. After the finisher 55 ejects the sheet, the finisher control section 551 sends an eject completion command to the print control section 521.

Further, at the same time when the transport processing of the first sheet starts, the print control section 521 enters a waiting period for the second sheet in accordance with the retained paper interval TID2, and starts transport processing of the second sheet after the waiting period ends. With this, it is possible to start transporting the second sheet before receiving the eject completion command of the first sheet. This arrangement reduces transport intervals (paper intervals) between sheets to be successively ejected, thereby improving the processing efficiency of the entire system.

Note that, FIG. 4 shows the processing of successive two sheets. However, processing of successive three or more sheets is similarly performed. In this case, it is preferable that the print control section 521 sends notification of the paper ID of an nth ($n \geqq 2$) sheet before starting transporting an $(n-1)$th sheet, and enters a waiting state in accordance with a notified paper interval TIDn simultaneously with the start of transporting of the $(n-1)$th sheet.

Next, the processing shown in FIG. 5 is an example of the operation in a case where the inserter 54 is provided between the copying machine 52 and the finisher 55. Note that, FIG. 5 shows the processing with respect to the first two sheets of a plurality of sheets successively processed.

First, the print control section 521 in the copying machine 52 sends to the finisher control section 551, the paper IDs (paper ID 1 and paper ID 2 in FIG. 5) of the sheets on which printing processing is to be performed.

In the arrangement where the inserter 54 is provided in the system, a signal sent from the print control section 521 to the inserter and a signal sent from the print control section 521 to the finisher control section 551 are both relayed by the inserter control section 541. Here, the inserter control section 541 checks the content of the command of the signal, and directly forwards the command if the command does not relate to the operation of the inserter 54. Accordingly, the paper IDs as described above are directly forwarded by the inserter control section 541 to the finisher control section 551.

Upon receiving notification of the papers IDs, the finisher control section 551 sends paper intervals to the print control section 521. The paper intervals are sent from the finisher control section 551 to the print control section 521 via the inserter control section 541. Because the paper interval is a command that does not relate to the operation of the inserter 54, the inserter control section 541 directly forwards the command to the print control section 521.

Upon receiving notification of the paper intervals, the print control section 521 causes the copying machine 52 to start transport processing of the sheets. First, the print control section 521 causes the copying machine 52 to start transport processing of the first sheet after waiting for a period in accordance with the paper interval TID1 for the first sheet (the waiting period is actually 0 because the paper interval TID1 for the first sheet is 0). Further, the print control section 521 sends a paper output command to the inserter control section 541 when a front edge of the transported sheet is detected by the paper output sensor of the copying machine 52 after the transport processing of the sheet starts. The print control section 521 then sends a paper output completion command to the inserter control section 541 when the sheet goes out of the paper output sensor, and, at the same time, the print control section 521 enters a waiting state before transporting the second sheet in accordance with the paper interval TID2.

The paper output command and the paper output completion command pass through the inserter control section 541. Here, the inserter control section 541 recognizes that the commands relate to the operation of the inserter 54, and performs predetermined processing in accordance with the commands. Specifically, with respect to the paper output command or paper output completion command, the inserter 54 is required to perform relay transport processing for transporting to the finisher 52 the sheet outputted from the copying machine 52. Therefore, by receiving the paper output command, the inserter control section 541 causes the inserter 54 to start transport processing; and by receiving the paper output completion command, the inserter section 541 knows that the paper output at the copying machine 52 has ended.

Further, the inserter control section 541 forwards to the finisher control section 551, the paper output command or the paper output completion command received from the print control section 551. Here, if the inserter control section 541 forwards the command immediately after receiving the command from the print control section 521, a time lag occurs between timing at which the finisher 55 receives the command and timing at which the finisher 55 receives the sheet corresponding to the command. Of course, this is because the inserter 54 attached between the copying machine 52 and the finisher 55 lengthens the transport path of the sheet, and thus lengthens the transport time of the sheet.

Therefore the inserter control section 541 temporarily retains the paper output command or the paper output completion command received from the print control section 521, and forwards the command to the finisher control section 551 in accordance with timing at which the inserter 54 outputs the sheet to the finisher 55. This timing is controlled in accordance with a signal from the paper output sensor of the inserter 54.

After receiving the paper output command, the finisher control section 551 controls the finisher 55 to perform transport processing and post-processing on the sheet sent from the inserter 54 and to eject the sheet. After the finisher 55 ejects the sheet, the finisher control section 551 sends an eject completion command to the inserter control section 541. Because notification of the eject completion is a command that does not relate to the operation of the inserter 54, the inserter control section 541 directly forwards the command to the print control section 521.

Further, before receiving notification of the eject completion of the first sheet, the print control section 521 starts transport processing of the second sheet after the waiting period in accordance with the paper interval TID2 ends. The transport processing of the second sheet is performed in a similar manner to the transport processing of the first sheet. Here, the print control section 521 starts the transport processing of the second sheet before receiving notification of the eject completion of the first sheet. However, depending on the waiting period in accordance with the paper interval TID2, the print control section 521 may start the transport processing of the second sheet after receiving notification of the eject completion of the first sheet.

Further, if the processing shown in FIG. 5 deals with successive three or more sheets, it is preferable that the print control section 521 sends notification of the paper ID of an nth ($n \geqq 2$) sheet before starting transporting an $(n-1)$th sheet, and enters a waiting state in accordance with a notified paper interval TIDn simultaneously with the start of transporting of the $(n-1)$th sheet.

Comparison between the operation of FIG. 4 and the operation of FIG. 5 shows that the processing performed by the print control section 521 and finisher control section 551 is the same irrespective of whether or not the inserter 54 is provided. Therefore the print control section 521 of the copying machine 52 does not require two types of control programs respectively for cases where the inserter 54 is provided and where the inserter 54 is not provided. This arrangement reduces the workload of processing on the print control section 521. In other words, even if the inserter 54 is provided, the print control section 521 is not required to control the transport timing with taking into account a transport time in the inserter 54.

Further, even if the inserter 54 usable in the image forming system may have one of a plurality of different specifications (if the length of the paper transport path in the inserter may differ depending on the size of the inserter, for example), the copying machine 52 and the finisher 55 are not required to prepare different control programs corresponding to the different specifications of the inserter 54.

Further, commands are sent from the print control section 521 to the finisher control section 551 via the inserter control section 541 if the inserter 54 is provided. This arrangement requires only one system of the control system, thereby simplifying the configuration of the control system.

Figure 6:
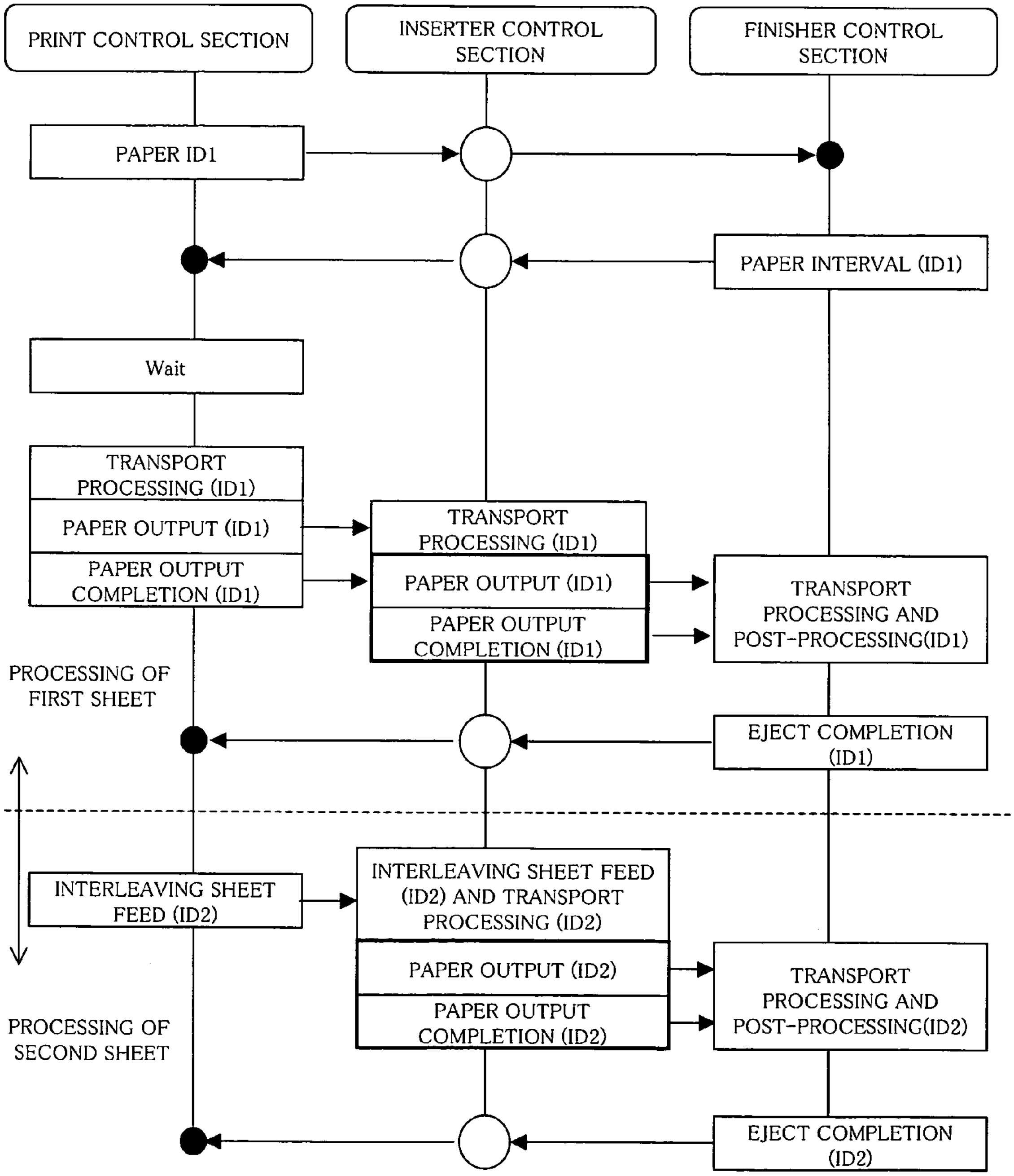
FIG. 6 is a flowchart showing an example of operation in which sheets that have been subjected to printing processing at the copying machine are ejected after an interleaving sheet set on an interleaving sheet feed tray is inserted in the sheets.

FIG. 6 is a flowchart showing an example of operation (insert mode 1) in a case where sheets that have been subjected to the printing processing at the copying machine 52 are ejected after an interleaving sheet set on the interleaving sheet feed tray 67 of the inserter 54 is inserted in the sheets. It is assumed in the operation in the insert mode 1 that the first sheet (paper ID: 1) is a sheet that has been subjected to the printing processing by the copying machine 52, and the second sheet (paper ID: 2) is an interleaving sheet inserted by the inserter 54.

In the operation in the insert mode 1, the print control section 521 starts controlling the processing of the second sheet when the print control section 521 finishes controlling the processing of the first sheet. Here, in the processing of the first sheet, the inserter 54 only performs relay transporting of the sheet, and the control sections operate as in the through mode as explained in FIG. 5, thus their detailed explanation is omitted here.

In the processing of the second sheet, the print control section 521 sends an interleaving sheet feed command to the inserter control section 541. Upon receipt of the interleaving sheet feed command, the inserter control section 541 causes the inserter 54 to start interleaving sheet feed processing for accepting into the transport path, an interleaving sheet set on the interleaving sheet feed tray 67, and transport processing for transporting the accepted interleaving sheet to the finisher 55. Further, the inserter control section 541 sends a paper output command to the finisher control section 551 when the interleaving sheet enters the paper output sensor of the inserter 54, and sends a paper output completion command to the finisher control section 551 when the interleaving sheet goes out of the paper output sensor.

After receiving the paper output command, the finisher control section 551 controls the finisher 55 to perform transport processing and post-processing on the sheet sent from the inserter 54 and to eject the sheet. When the ejection of the sheet at the finisher 55 ends, the finisher control section 551 sends an eject completion command to the inserter control section 541. Because notification of the eject completion is a command that does not relate to the operation of the inserter 54, the inserter control section 541 directly forwards the command to the print control section 521.

Further, in the processing shown in FIG. 6, if the copying machine 52 further continues after the interleaving sheet insertion processing, the processing for outputting sheets that have been subjected to the printing processing, the outputting processing may be performed in a manner similar to that in the through mode as explained in FIG. 5.

Figure 7:
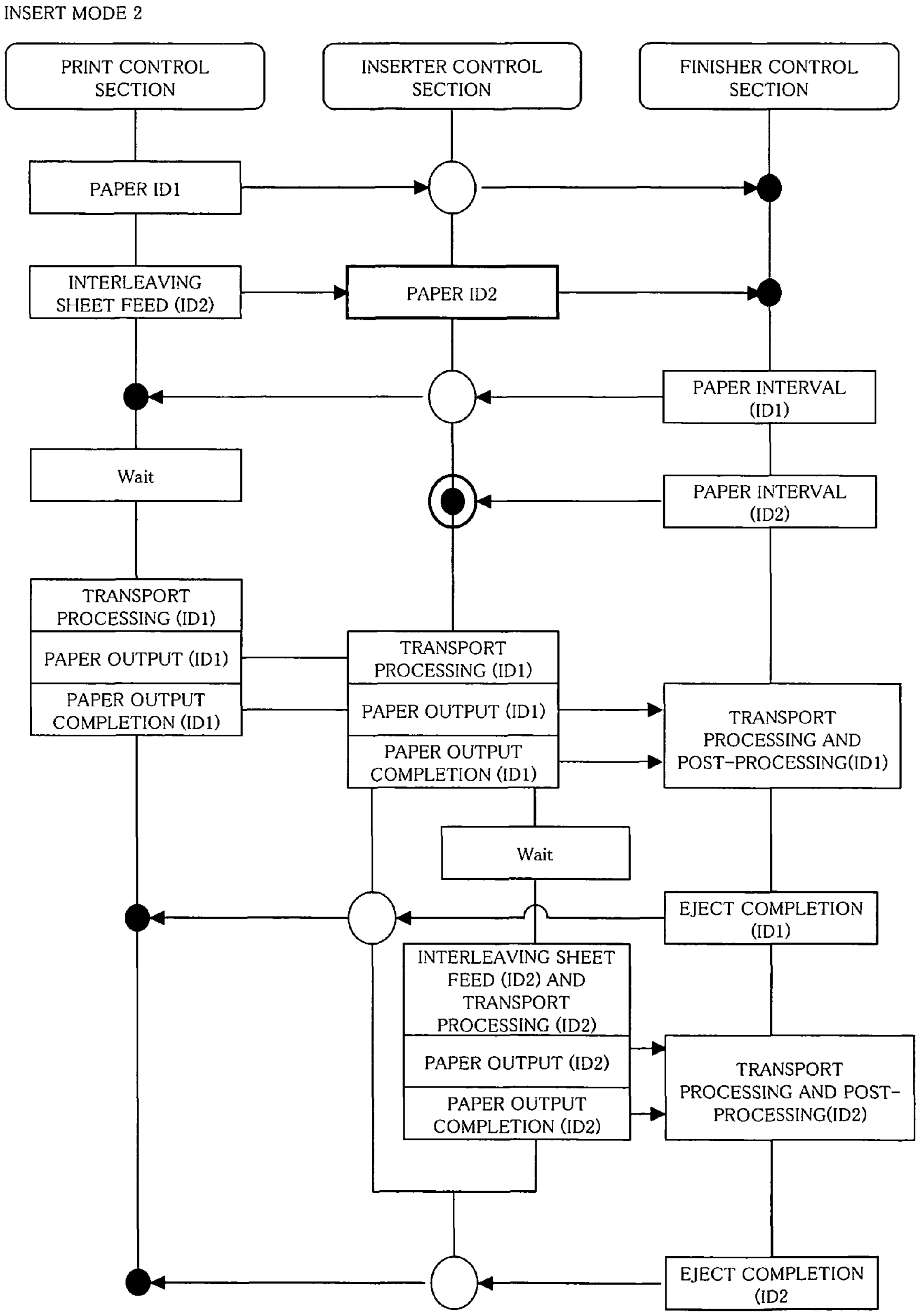
FIG. 7 is a flowchart showing another example of operation in which sheets that have been subjected to printing processing at the copying machine are ejected after an interleaving sheet set on an interleaving sheet feed tray is inserted in the sheets.
Figure 8:
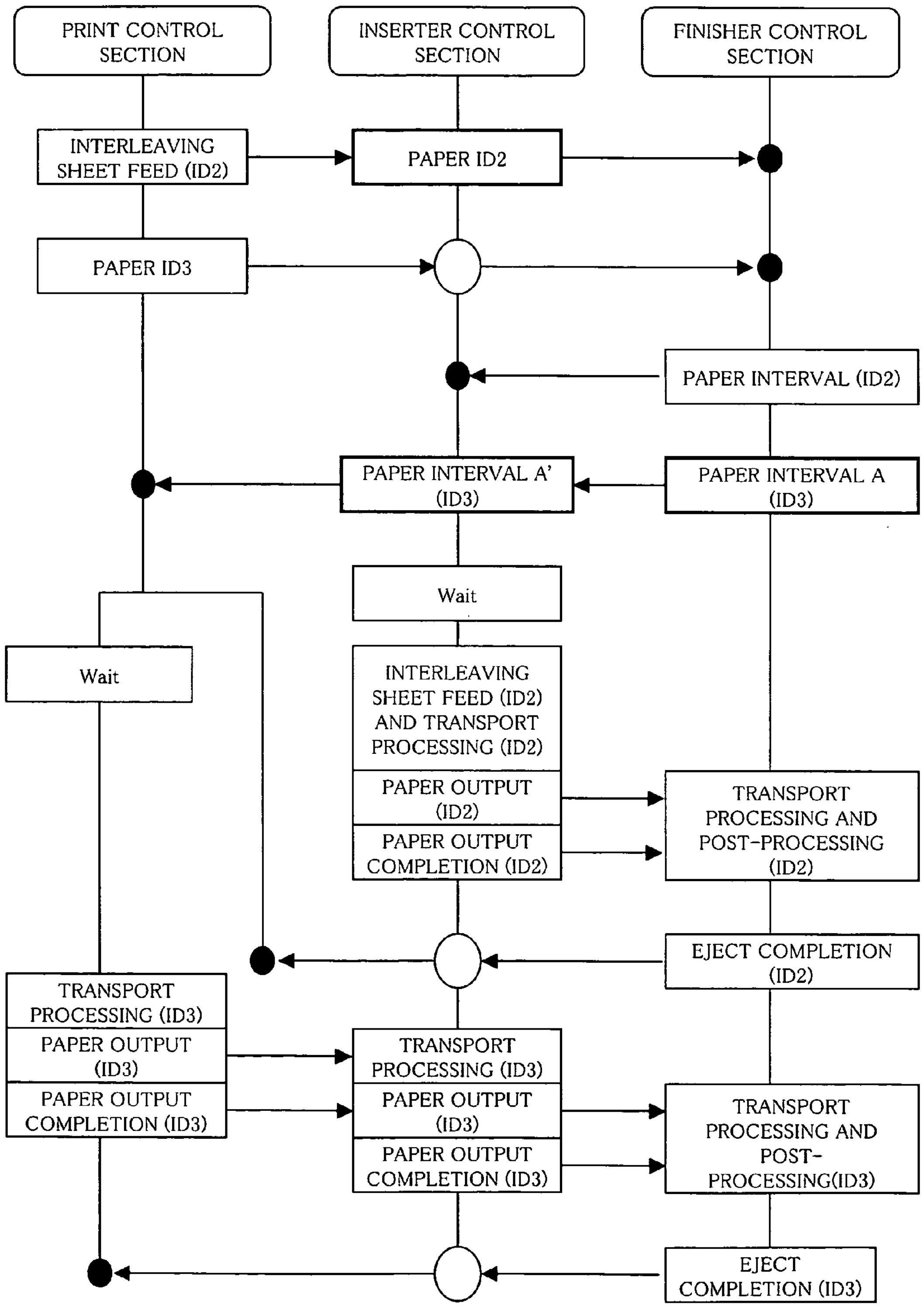
FIG. 8 is a flowchart showing a further example of operation in which sheets that have been subjected to printing processing at the copying machine are ejected after an interleaving sheet set on an interleaving sheet feed tray is inserted in the sheets.

FIGS. 7 and 8 are flowcharts showing other examples of operation in a case where sheets that have been subjected to the printing processing at the copying machine 52 are ejected after an interleaving sheet set on the interleaving sheet feed tray 67 of the inserter 54 is inserted in the sheets. It is assumed in the operation in an insert mode 2 shown in FIG. 7 that the first sheet (paper ID: 1) is a sheet subject to the printing processing by the copying machine 52, and the second sheet (paper ID: 2) is an interleaving sheet inserted by the inserter 54.

The operation in the insert mode 2 differs from the operation in the insert mode 1 in that control of the processing of the second sheet starts before control of the processing of the first sheet ends.

First, the print control section 521 sends to the inserter control section 541, notification of the paper ID of the first sheet and an interleaving sheet feed command for the second sheet. The inserter control section 541 which has received the paper ID and the interleaving sheet feed command directly forwards the paper ID (namely, paper ID 1) to the finisher control section 551. Further, with respect to the paper ID as the interleaving sheet feed command (namely, paper ID 2), the inserter control section 541 recognizes that the paper ID 2 indicates the output of an interleaving sheet, and retains the command and then forwards the command to the finisher control section 551.

The finisher control section 551 calculates a paper interval for each of the notified paper ID 1 and paper ID 2. Then, the finisher control section 551 sends the paper interval for the paper ID 1 to the print control section 521 via the inserter control section 541, and sends the paper interval for the paper ID 2 to the inserter control section 541. The inserter control section 541 directly forwards the paper interval for the paper ID 1 to the print control section 521, and retains the paper interval for the paper ID 2.

Note that, the paper interval for the paper ID 1 is calculated in a similar manner to the calculation of the paper interval shown in FIG. 4, etc. On the other hand, the paper interval for the paper ID 2 indicates a time interval until the outputting of the next sheet is allowed after the paper output command for the first sheet is received at the finisher control section 551 (or after a back edge of the sheet is detected by the paper output sensor of the inserter 54 or after a front edge of the sheet is detected by the paper input sensor of the finisher 55). Namely, the paper interval for the paper ID 2 is calculated in accordance with the content of the transport processing and post-processing that the finisher 55 performs on the sheet whose paper ID is 1.

Upon receiving notification of the paper interval for the paper ID 1, the print control section 521 waits if necessary in accordance with the paper interval, and then causes the copying machine 52 to start transport processing of the sheet whose paper ID is 1. Further, when the sheet enters the paper output sensor at the exit of the copying machine after the transport processing starts, the print control section 521 sends a paper output command to the inserter control section 541. When the sheet goes out of the paper output sensor, the print control section 521 sends a paper output completion command to the inserter control section 541.

Upon receiving the paper output command from the print control section 521, the inserter control section 541 causes the inserter 54 to start transport processing for relaying and transporting to the finisher 55, the sheet transported from the copying machine 52, and forwards the received paper output command or paper output completion command to the finisher control section 551. Further, the inserter control section 541 enters a waiting period in accordance with the pre-notified paper interval for the paper ID 2. Here, the starting point of the waiting period is a time when the inserter control section 541 received the paper output command or the paper output completion command from the print control section 521. After the waiting period ends, the inserter control section 541 causes the inserter 54 to start interleaving sheet feed processing and transport processing. Here, the waiting period for the interleaving sheet feed processing may be a period obtained by subtracting from the period notified as the paper interval (i) a period for the interleaving sheet feed processing and (ii) a transport time of the sheet from the inserter 54 to the finisher 55.

After receiving the paper output command, the finisher control section 551 controls the finisher 55 to perform transport processing and post-processing on the sheet sent from the inserter 54 and to eject the sheet. After the finisher 55 ejects the sheet, the finisher control section 551 sends an eject completion command to the inserter control section 541. The inserter control section 541 directly forwards notification of the eject completion to the print control section 521.

Further, the inserter control section 541 causes the inserter 54 to start interleaving sheet feed processing and transport processing of the thus fed interleaving sheet after the waiting period ends. Note that, the inserter control section 541 may start the interleaving sheet feed processing before receiving notification of the eject completion for the paper ID 1. When the interleaving sheet enters the paper output sensor of the inserter 54 after the transport processing starts, the inserter control section 541 generates a paper output command and sends the paper output command to the finisher control section 551. When the interleaving sheet goes out of the paper output sensor, the inserter control section 541 sends a paper output completion command to the finisher control section 551.

After receiving the paper output command, the finisher control section 551 controls the finisher 55 to perform transport processing and post-processing on the sheet sent from the inserter 54 (namely, the interleaving sheet) and to eject the sheet. After the finisher 55 ejects the sheet, the finisher control section 551 sends an eject completion command to the inserter control section 541. The inserter control section 541 directly forwards notification of the eject completion to the print control section 521.

Next, in the operation in an insert mode 3 shown in FIG. 8, it is assumed that the first sheet (paper ID: 2) is an interleaving sheet inserted by the inserter 54, and the second sheet (paper ID: 3) is a sheet that has been subjected to the printing processing at the copying machine 52.

First, the print control section 521 sends to the inserter control section 541, a paper ID command for the first sheet (interleaving sheet), and a paper ID command for the second sheet. The inserter control section 541 which has received the paper IDs recognizes that the paper ID command for the first sheet, namely, the paper ID 2 indicates the output of an interleaving sheet, and retains the command and then forwards the command to the finisher control section 551. The inserter control section 541 directly forwards the next paper ID (namely, paper ID 3) to the finisher control section 551.

The finisher control section 551 calculates a paper interval for each of the notified paper ID 2 and paper ID 3. Then, the finisher control section 551 sends the paper interval for the paper ID 2 to the inserter control section 541 and the paper interval for the paper ID 3 to the print control section 521 via the inserter control section 541. The paper intervals for the paper ID 2 and paper ID 3 are calculated in a manner similar to the calculation of the paper intervals for the paper ID 2 and paper ID 1 shown in FIG. 7.

The inserter control section 541 retains the paper interval for the paper ID 2, and forwards the paper interval for the paper ID 3 to the print control section 521. On the other hand, the inserter control section 541 forwards to the print control section 52, the paper interval for the paper ID 3 after adding a processing time at the inserter 54 to the paper interval.

Namely, the copying machine 52 starts transport processing after a predetermined waiting period in accordance with the notified paper interval ends. Since the interleaving sheet insertion processing is performed at the inserter 54 before the transport processing starts, the waiting period of the copying machine 52 is to include a time for the interleaving sheet insertion processing at the inserter 54. The paper interval (paper interval A) for the paper ID 3 calculated by the finisher control section 551 does not include the processing time at the inserter 54. Accordingly, the inserter control section 541 adds the processing time at the inserter 54 to the paper interval A that is notified from the finisher control section 551, and forwards to the print control section 521, the resultant paper interval as the paper interval A'. The print control section 521 enters a waiting state immediately after receiving notification of the paper interval A'.

Further, upon receiving notification of the paper interval for the. paper ID 2, the inserter control section 541 waits if necessary in accordance with the paper interval, and then causes the inserter 54 to start interleaving sheet feed processing and interleaving sheet transport processing of the sheet for the paper ID 2. Further, when the sheet enters the paper output sensor of the inserter 54 after the interleaving sheet transport processing starts, the inserter control section 541 sends a paper output command to the finisher control section 551. When the sheet goes out of the paper output sensor, the inserter control section 541 sends a paper output completion command to the finisher control section 551.

After receiving the paper output command, the finisher control section 551 controls the finisher 55 to perform transport processing and post-processing on the sheet sent from the inserter 54 (namely, interleaving sheet) and to eject the sheet. After the finisher 55 ejects the sheet, the finisher control section 551 sends an eject completion command to the inserter control section 541. The inserter control section 541 directly forwards notification of the eject completion to the print control section 521.

After the waiting period in accordance with the paper interval A' ends, the print control section 521 causes the copying machine 52 to start transport processing of the sheet whose paper ID is 1. Note that, the print control section 521 may start the transport processing before receiving notification of the eject completion for the paper ID 2. Further, the print control section 521 outputs either a paper output command or paper output completion command simultaneously with the start of the transport processing.

Upon receiving the paper output command from the print control section 521, the inserter control section 541 causes the inserter 54 to start transport processing for relaying and transporting to the finisher 55, the sheet transported from the copying machine 52, and forwards the received paper output command or paper output completion command to the finisher control section 551.

After receiving the paper output command, the finisher control section 551 controls the finisher 55 to perform transport processing and post-processing on the sheet sent from the inserter 54 and to eject the sheet. After the finisher 55 ejects the sheet, the finisher control section 551 sends an eject completion command to the inserter control section 541. The inserter control section 541 directly forwards notification of the eject completion to the print control section 521.

In a case where interleaving sheet insertion processing is performed for inserting an interleaving sheet fed by the inserter 54 into the sheets successively output from the copying machine 52, the processing shown in FIGS. 7 and 8 may be performed at a portion where the interleaving sheet is to be inserted.

Note that, FIGS. 7 and 8 both show the processing with respect to the first two sheets of a plurality of sheets successively processed. Thus, the print control section 521 almost simultaneously sends the notification of the first paper ID and the interleaving sheet feed command. However, processing of successive three or more sheets may be similarly performed. In this case, the operations shown in FIG. 7 and 8 can be applied to the processing of three or more sheets if the print control section 521 sends notification of the paper ID of an nth ($n \geqq 2$) sheet (or sends an interleaving paper feed command) before starting transporting an $(n-1)$th sheet. Note that, at a portion where sheets output from the copying machine 52 are successively ejected, the operation shown in FIG. 5 may be performed.

In the operations shown in FIGS. 6 through 8, the processing for sending commands and calculating paper intervals at the print control section 521 and finisher control section 551 do not need to take into account processing performed by the inserter 54 even if the inserter 54 is provided. In other words, control and adjustment concerning the processing performed by the inserter 54 are all performed by the inserter control section 541. Therefore the print control section 521 of the copying machine 52 does not require two types of control programs respectively for cases where the inserter 54 is provided and where the inserter 54 is not provided, thereby reducing the workload of processing on the print control section 521.

Further, even if the inserter 54 usable in the image forming system may have one of a plurality of different specifications, the copying machine 52 and the finisher 55 are not required to prepare different control programs corresponding to the different specifications of the inserter 54.

Further, the commands are transmitted between the print control section 521 and the finisher control section 551 via the inserter control section 541. This arrangement requires only one system of the control system, thereby simplifying the configuration of the control system.

Note that, in the processing shown in FIG. 6, if the interleaving sheet insertion processing is performed between sheets that have been subjected to the printing processing at the copying machine 52, the interleaving sheet insertion processing is performed after the outputting operation of the immediately preceding sheet ends. This arrangement simplifies the control of the interleaving sheet insertion, but, to a certain degree, lowers the performance on the outputting of the sheets at a portion where the interleaving sheet insertion is performed.

On the other hand, in the processing shown in FIGS. 7 and 8, if the interleaving sheet insertion processing is performed between the sheets that have been subjected to printing processing at the copying machine 52 as described above, the paper intervals are appropriately controlled with taking account of the interleaving sheet insertion processing. Therefore, though the control becomes complicated to a certain degree, the performance on the outputting of the sheets is not lowered at the portion where the interleaving sheet insertion is performed.

Figure 9:
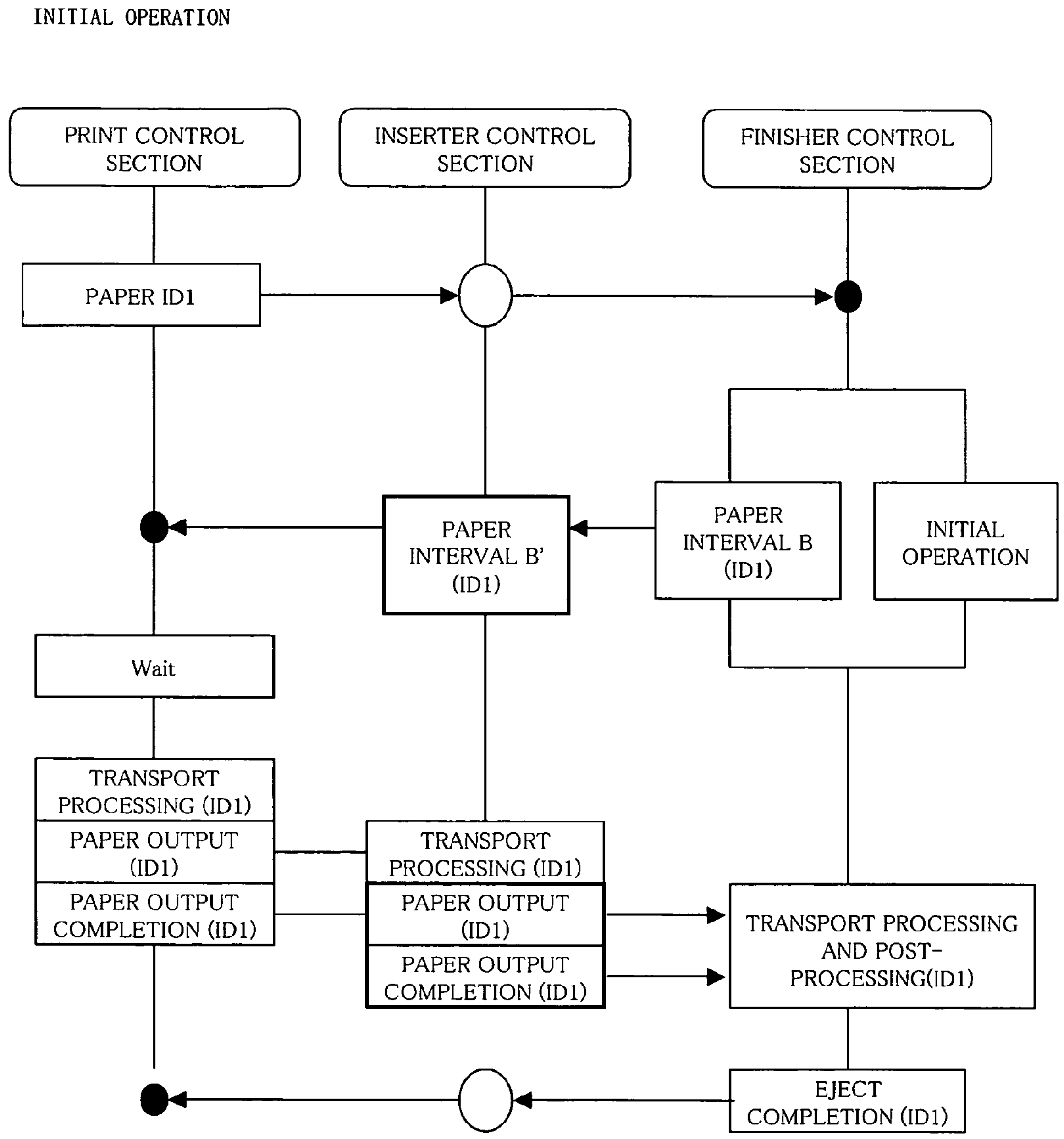
FIG. 9 is a flowchart showing an example of operation that includes an initial operation at the finisher.
Figure 10A:
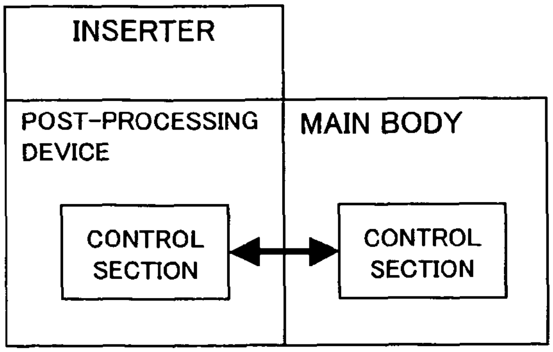
FIG. 10(*a*) is a block diagram showing a control system in an image forming system composed of an image forming apparatus and an optional device, in a case where an optional device is arranged so that an inserter device and a post-processing device are integrated.
Figure 10B:
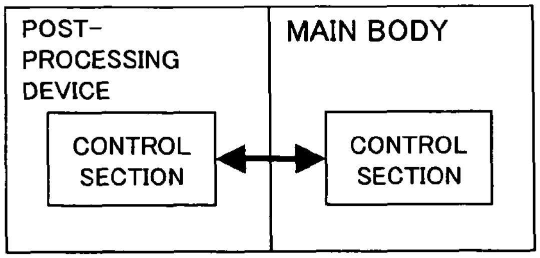
Figure 10C:
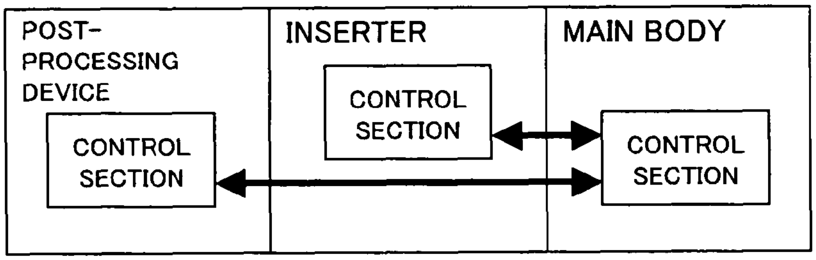
Figure 10D:
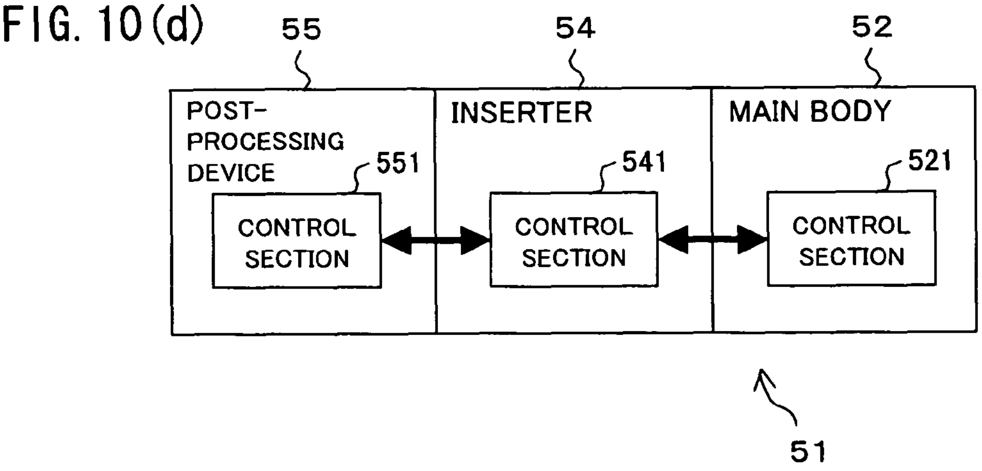

FIG. 9 is a flowchart showing an example of the operation that includes an initial operation at the finisher 55. Note that, the initial operation is running for setup, checking operation, etc., of parts of the finisher 55 when the finisher 55 starts operating first.

First, the print control section 521 notifies the finisher control section 551 of the paper ID of the sheet. The inserter control section 541 which has received the paper ID directly forwards the paper ID to the finisher control section 551.

The finisher control section 551 which has received notification of the paper ID causes the finisher 55 to start the initial operation in response to the notification. Further, the finisher control section 551 calculates a paper interval (paper interval B) and sends the calculated paper interval to the print control section 521. The paper interval B calculated here is a time required for the initial operation at the finisher 55. The inserter control section 541 sends to the print control section 521 paper interval B' obtained by subtracting a transport time at the inserter 54 from the paper interval B. Here, the inserter control section 541 performs the above subtraction processing for the following reason.

When receiving notification of the paper interval B', the print control section 521 waits if necessary in accordance with the notified paper interval, and then causes the copying machine 52 to start transport processing of the sheet whose paper ID is 1. Here, a predetermined time for the waiting may be a period obtained by subtracting from the period notified as the paper interval (i) a period for the image forming processing at the copying machine 52 and (ii) a transport time of the sheet from the copying machine 52 to the finisher 55. Note that, the transport time of the sheet from the copying machine 52 to the finisher 55 does not include a transport time of the sheet at the inserter 54.

Therefore if the paper interval B calculated by the finisher control section 551 is directly used as the paper interval notified to the print control section 521, transporting of the sheet to the finisher 55 is delayed for a period of the transport time at the inserter 54.

Therefore, in the system configuration where the inserter 54 is provided between the copying machine 52 and the finisher 55, the inserter control section 541 subtracts the transport time at the inserter 54 from the paper interval B notified from the finisher 55, so that the print control section 521 can obtain a paper interval that takes into account the transport time at the inserter 54. With this, it is possible to cause the sheet to reach the finisher in accordance with timing at which the finisher 55 finishes the initial operation, thereby improving printing performance.

Further, the print control section 521 causes the copying machine 52 to start transport processing of the sheet, and outputs a paper output command or a paper output completion command.

Upon receiving the paper output command from the print control section 521, the inserter control section 541 causes the inserter 54 to start transport processing for relaying and transporting to the finisher 55, the sheet transported from the copying machine 52. When the sheet enters the paper output sensor of the inserter 54, the inserter control section 541 sends a paper output completion command to the finisher control section 551. When the sheet goes out of the paper output sensor, the inserter control section 541 sends a paper output completion command to the finisher control section 551.

After receiving the paper output command, the finisher control section 551 controls the finisher 55 to perform transport processing and post-processing on the sheet sent from the inserter 54 and to eject the sheet. After the finisher 55 ejects the sheet, the finisher control section 551 sends an eject completion command to the inserter control section 541. The inserter control section 541 directly forwards notification of the eject completion to the print control section 521.

In the operation shown in FIG. 9, the processing for sending commands and calculating paper intervals at the print control section 521 and finisher control section 551 do not need to take into account processing performed by the inserter 54 even if the inserter 54 is provided. In other words, control and adjustment concerning the processing performed by the inserter 54 are all performed by the inserter control section 541. Therefore the print control section 521 of the copying machine 52 does not require two types of control programs respectively for cases where the inserter 54 is provided and where the inserter 54 is not provided, thereby reducing the workload of processing on the print control section 521.

Further, even if the inserter 54 usable in the image forming system may have one of a plurality of different specifications, the copying machine 52 and the finisher 55 are not required to prepare different control programs corresponding to the different specifications of the inserter 54.

Further, the commands are transmitted between the print control section 521 and the finisher control section 551 via the inserter control section 541. This arrangement requires only one system of the control system, thereby simplifying the configuration of the control system.

As described above, the image forming system in accordance with the present embodiment in which the inserter device and the post-processing device are attached to the image forming apparatus is so arranged that timing of transporting sheets that are relayed by the inserter is adjusted and controlled by the inserter. With this, the image forming apparatus main body and the post-processing device are not required to prepare a paper transport control program that takes into account the inserter.

Note that, the foregoing explanation showed the examples in which the paper IDs for the two sheets are notified first in a case where a plurality of sheets are successively output. However, if the form that can output input images to ten sheets, for example, has been prepared before the printing starts, the paper IDs for all the ten sheets may be notified to the finisher before the printing starts.

In other words, it is possible to achieve high-speed printing in the specification of the present system if the image forming apparatus receives a paper interval for an nth sheet before starting transporting an (n−1)th sheet.

As described above, an image forming system of the present invention in which an inserter device and a post-processing device are attached to an image forming apparatus is so arranged that a control command communicated between the image forming apparatus and the post-processing device is relayed by the inserter device.

With this arrangement, a control command communicated between the image forming apparatus and the post-processing device is sent via the inserter device. Therefore the image forming apparatus is not required to be provided with control systems respectively for the inserter device and the post-processing device. Accordingly, only one system of the control system is required, so that the arrangement of the control system is simplified.

Further, the image forming system is preferably arranged so that the image forming apparatus and the post-processing device generate the control command without taking into account processing at the inserter device; and the inserter device judges content of the control command upon receiving the control command issued by the image forming apparatus, and forwards the control command after converting the control command or adjusting output timing of the control command if the control command needs to take into account the processing at the inserter device.

With this arrangement, the image forming apparatus and the post-processing device generate the control command without taking into account processing at the inserter device. Therefore, even if the image forming system is usable in a system configuration that is not provided with the inserter device, it is not necessary to vary the processing in accordance with whether or not the inserter device is provided. In other words, the image forming apparatus does not require two types of control programs respectively for cases where the inserter device is provided and where the inserter device is not provided, thereby reducing the workload of processing on the image forming apparatus.

Note that, if a control command communicated between the image forming apparatus and the post-processing device needs to take into account processing at the inserter device in the system configuration provided with the inserter device, the inserter device itself converts the control command or adjusts output timing of the control command before forwarding the control command. Therefore even if the inserter device usable in the image forming system may have one of a plurality of different specifications, the image forming apparatus and the post-processing device are not required to prepare different control programs corresponding to the different specifications of the inserter device.

Further, the image forming system is preferably arranged so that if the inserter device receives a paper output command issued by the image forming apparatus, the inserter device starts in response to the receipt of the paper output command, relay transport processing of a sheet outputted from the image forming apparatus, and sends the paper output command to the post-processing device in accordance with timing at which the inserter device outputs the sheet to the post-processing device (timing at which a paper output sensor provided to the inserter device detects a front edge of the sheet, for example).

With this arrangement, the image forming apparatus can send a paper output command without regard to whether or not the inserter device is provided, when issuing and sending the paper output command. Specifically, the transport time of the sheet transported from the image forming apparatus to the post-processing device becomes longer if the inserter device is provided because the sheet passes through the inserter device. However, timing of the paper output command corresponding to the sheet is adjusted at the inserter device so as to coincide with the timing at which the sheet is transported. With this, it is possible to reduce the workload of processing on the image forming apparatus.

The image forming system is preferably arranged so that if the inserter device receives a paper output completion command issued by the image forming apparatus, the inserter device sends the paper output completion command to the post-processing device in accordance with timing at which the inserter device finishes outputting the sheet to the post-processing device (timing at which a paper output sensor provided to the inserter device detects a back edge of the sheet, for example).

With this arrangement, the image forming apparatus can send a paper output completion command without regard to whether or not the inserter device is provided, when issuing and sending the paper output completion command as in the case of the paper output command.

Further, the image forming system is preferably arranged so that if the inserter device receives an interleaving sheet feed command from the image forming apparatus, the inserter device starts interleaving sheet feed processing in response to the receipt of the interleaving sheet feed command, and sends either a paper output command or paper output completion command to the post-processing device in accordance with predetermined timing.

With this arrangement, the image forming apparatus is only required to send an interleaving sheet feed command to the inserter device in order to cause the inserter device to perform the interleaving sheet feed processing. Namely, a paper output command or paper output completion command to be sent to the post-processing device with respect to the interleaving sheet transported from the inserter device to the post-processing device is generated by the inserter device. Further, transmission timing of the paper output command or paper output completion command is adjusted at the inserter device so as to coincide with the timing at which the interleaving sheet is transported. With this, it is possible to reduce the workload of processing on the image forming apparatus.

Note that, the predetermined timing at which the paper output command is sent to the post-processing device is timing at which the inserter device outputs the interleaving sheet to the post-processing device. Further, the predetermined timing at which the paper output completion command is sent to the post-processing device is timing at which the inserter device finishes outputting the interleaving sheet.

The image forming system is preferably arranged so that if the inserter device receives a command with which the post-processing device notifies the image forming apparatus of transport timing of a sheet, the inserter device adjusts the transport timing in the command if necessary so that the transport timing takes into account a transport time of the sheet in the inserter device, and then forwards to the image forming apparatus the command containing the adjusted transport timing.

In this image forming system, a command with which the post-processing device notifies the image forming apparatus of transport timing of a sheet may be sent from the post-processing device to the image forming apparatus. This is intended to shorten the transport intervals between sheets consecutively ejected (paper interval) so as to improve the processing efficiency of the entire system.

With the foregoing arrangement, the post-processing device can send the command for notifying the transport timing without taking into account whether or not the inserter device is provided. Specifically, the transport time of the sheet transported from the image forming apparatus to the post-processing device becomes longer if the inserter device is provided because the sheet passes through the inserter device. However, in the foregoing arrangement, transport timing of the sheet is adjusted if necessary so as to take into account the transport time of the sheet in the inserter device. With this, the image forming apparatus can obtain appropriate transport timing.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image forming system in which an inserter device and a post-processing device are attached to an image forming apparatus, wherein:

a control command communicated between the image forming apparatus and the post-processing device is relayed by the inserter device and does not include timing information for the inserter device;

the inserter device is provided between the image forming apparatus and the post-processing device so as to perform sheet relay transport between the image forming apparatus and the post-processing device and the inserter device is provided separately from the image forming apparatus and the post-processing device, and the inserter device is capable of being optionally attached between the image forming apparatus and the post processing device (as an optional device);

the inserter device judges content of the control command upon receiving the control command issued by the image forming apparatus; and when the control command does not relate to the operation of the inserter device, the inserter device immediately forwards the control command to the post-processing device, and when the control command entails sheet relay transport by the inserter device, the inserter device retains the control command and then forwards to the post-processing device the control command in accordance with timing at which the inserter device outputs a sheet to the post-processing device.

2. The image forming system as set forth in claim 1, wherein:

a control command indicating that a sheet has entered a paper output sensor at an exit of the image forming apparatus is considered a paper output command; and if the inserter device receives a paper output command issued by the image forming apparatus, the inserter device starts in response to the receipt of the paper output command, relay transport processing of a sheet outputted from the image forming apparatus, and sends the paper output command to the post-processing device in accordance with timing at which the inserter device outputs the sheet to the post-processing device.

3. The image forming system as set forth in claim 2, wherein:

a control command indicating that a sheet has passed through a paper output sensor at an exit of the image forming apparatus is considered a paper output completion command; and if the inserter device receives a paper output completion command issued by the image forming apparatus, the inserter device sends the paper output completion command to the post-processing device in accordance with timing at which the inserter device finishes outputting the sheet to the post-processing device.

4. The image forming system as set forth in claim 1, wherein:

if the inserter device receives an interleaving sheet feed command from the image forming apparatus, the inserter device starts interleaving sheet feed processing in response to the receipt of the interleaving sheet feed command, and sends either a paper output command or a paper output completion command to the post-processing device in accordance with predetermined timing.

5. The image forming system as set forth in claim 1, wherein:

if the inserter device receives a command with which the post-processing device notifies the image forming apparatus of transport timing of a sheet, the inserter device adjusts the transport timing in the command if necessary so that the transport timing takes into account a transport time of the sheet in the inserter device, and then forwards to the image forming apparatus the command containing the adjusted transport timing.

6. The image forming system as set forth in claim 1, wherein:

the inserter device inserting a desired sheet that has not passed through the image forming apparatus into a certain position before or after a sheet or group of sheets sent from the image forming apparatus toward the post-processing device.

7. An inserter device which is provided between an image forming apparatus and a post-processing device, and which composes an image forming system together with the image forming apparatus and the post-processing device, wherein:

the inserter device relays a control command communicated between the image forming apparatus and the post-processing device and the inserter device is provided separately from the image forming apparatus and the post-processing device, and the inserter device is capable of being optionally attached between the image forming apparatus and the post-processing device (as an optional device);

the control command does not include timing information for the inserter device;

the inserter device is provided between the image forming apparatus and the post-processing device so as to perform sheet relay transport between the image forming apparatus and the post-processing device;

the inserter device judges content of the control command communicated between the image forming apparatus and the post-processing device upon receiving the control command; and when the control command does not relate to the operation of the inserter device, the inserter device immediately forwards the control command to the post-processing device, and when the control command entails sheet relay transport by the inserter device, the inserter device retains the control command and then forwards to the post-processing device the control command in accordance with timing at which the inserter device outputs a sheet to the post-processing device.

8. The inserter device as set forth claim 7, wherein:

a control command indicating that a sheet has entered a paper output sensor at an exit of the image forming apparatus is considered a paper output command; and if the inserter device receives a paper output command issued by the image forming apparatus, the inserter device starts in response to the receipt of the paper output command, relay transport processing of a sheet outputted from the image forming apparatus, and sends the paper output command to the post-processing device in accordance with timing at which the inserter device outputs the sheet to the post-processing device.

9. The inserter device as set forth in claim 8, wherein:

a control command indicating that a sheet has passed through a paper output sensor at an exit of the image forming apparatus is considered a paper output completion command; and if the inserter device receives a paper output completion command issued by the image forming apparatus, the inserter device sends the paper output completion command to the post-processing device in accordance with timing at which the inserter device finishes outputting the sheet to the post-processing device.

10. The inserter device as set forth in claim 7, wherein:

if the inserter device receives an interleaving sheet feed command from the image forming apparatus, the inserter device starts interleaving sheet feed processing in response to the receipt of the interleaving sheet feed command, and sends either a paper output command or a paper output completion command to the post-processing device in accordance with predetermined timing.

11. The inserter device as set forth in claim 7, wherein:

if the inserter device receives a command with which the post-processing device notifies the image forming apparatus of transport timing of a sheet, the inserter device adjusts the transport timing in the command if necessary so that the transport timing takes into account a transport time of the sheet in the inserter device, and then forwards to the image forming apparatus the command containing the adjusted transport timing.

12. The inserter device as set forth in claim 7, wherein:

the inserter device inserting a desired sheet that has not passed through the image forming apparatus into a certain position before or after a sheet or group of sheets sent from the image forming apparatus toward the post-processing device.

* * * * *